United States Patent
Sattler et al.

(10) Patent No.: US 11,117,983 B2
(45) Date of Patent: Sep. 14, 2021

(54) CARBON DIOXIDE AS A CATALYST QUENCH AGENT IN SOLUTION POLYMERIZATION, AND PRODUCTS MADE THEREFROM

(71) Applicant: ExxonMobil Chemical Patents Inc., Baytown, TX (US)

(72) Inventors: Aaron Sattler, Annandale, NJ (US); George Rodriguez, Houston, TX (US); Charles J. Harlan, Houston, TX (US); Aakriti Jain, Austin, TX (US); Florin Barsan, Pearland, TX (US); Danica L. Nguyen, Houston, TX (US); Michael F. McDonald, Jr., Kingwood, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/638,961

(22) PCT Filed: Jul. 5, 2018

(86) PCT No.: PCT/US2018/040837
§ 371 (c)(1),
(2) Date: Feb. 13, 2020

(87) PCT Pub. No.: WO2019/045878
PCT Pub. Date: Mar. 7, 2019

(65) Prior Publication Data
US 2020/0223953 A1    Jul. 16, 2020

Related U.S. Application Data

(60) Provisional application No. 62/551,380, filed on Aug. 29, 2017.

(30) Foreign Application Priority Data

Nov. 17, 2017    (EP) ..................... 17202252

(51) Int. Cl.
*C08F 6/02*    (2006.01)

(52) U.S. Cl.
CPC ..................... *C08F 6/02* (2013.01)

(58) Field of Classification Search
CPC .... C08F 2/12; C08F 6/02; C08F 10/00; C08F 4/65927; C08F 4/65912; C08F 4/65908;
(Continued)

(56) References Cited

U.S. PATENT DOCUMENTS

| 2,653,959 A | 9/1953 | Moore et al. |
| 2,943,105 A | 6/1960 | Neal |

(Continued)

FOREIGN PATENT DOCUMENTS

| EP | 1022056 A1 | 7/2000 |
| WO | 2002/06188 A2 | 1/2002 |

(Continued)

OTHER PUBLICATIONS

Yu G. Osokin, Petroleum Chemistry (2007), pp. 1-11, vol. 47.
(Continued)

*Primary Examiner* — William K Cheung

(57) ABSTRACT

A method for making a polymer, having the steps of (a) polymerizing one or more monomers in the presence of a solvent and a catalyst to form a reaction product; (b) removing an effluent from the reaction product, where the effluent comprises an active catalyst and one or more unreacted monomers; (c) combining a quench, comprising carbon dioxide, with the effluent to form a quenched polymer stream, having a carboxyl metal complex; and (d) recovering a polymer from the quenched polymer stream.

18 Claims, 1 Drawing Sheet

(58) Field of Classification Search
CPC ........ C08F 8/44; C08F 210/18; C08F 210/06; C08F 210/16
USPC .......................................................... 526/68
See application file for complete search history.

(56) References Cited

U.S. PATENT DOCUMENTS

| | | | |
|---|---|---|---|
| 3,489,808 A | | 1/1970 | Eberly |
| 3,598,887 A | * | 8/1971 | Darcy et al. ........ C08F 297/044 525/271 |
| 3,931,350 A | | 1/1976 | Sparks |
| 4,306,044 A | | 12/1981 | Charsley |
| 4,337,156 A | | 6/1982 | Derosset |
| 4,834,947 A | | 5/1989 | Cook et al. |
| 5,245,107 A | | 9/1993 | Yon et al. |
| 5,326,855 A | | 7/1994 | Kahn |
| 5,427,689 A | | 6/1995 | Kallenbach et al. |
| 5,777,143 A | | 7/1998 | Malpass et al. |
| 6,051,631 A | | 4/2000 | Hottovy |
| 6,111,162 A | | 8/2000 | Rossini |
| 6,118,037 A | | 9/2000 | Piccoli et al. |
| 6,632,766 B2 | | 10/2003 | Kanazirev |
| 6,790,344 B1 | | 9/2004 | Min et al. |
| 6,987,152 B1 | | 1/2006 | Eisinger et al. |
| 7,102,044 B1 | | 9/2006 | Kulprathipanja et al. |
| 7,141,630 B2 | | 11/2006 | Vizzini et al. |
| 7,141,631 B2 | | 11/2006 | Murakami et al. |
| 7,326,821 B2 | | 2/2008 | Risch et al. |
| 7,368,618 B2 | | 5/2008 | Kulprathipanja et al. |
| 7,576,248 B2 | | 8/2009 | Kulprathipanja et al. |
| 9,382,344 B2 | | 7/2016 | Ho et al. |
| 2002/0147377 A1 | | 10/2002 | Kanazirev et al. |
| 2004/0254416 A1 | | 12/2004 | Risch et al. |
| 2008/0194777 A1 | | 8/2008 | Richard et al. |
| 2009/0312511 A1 | | 12/2009 | Ramage et al. |
| 2010/0197989 A1 | | 8/2010 | Ducreux et al. |
| 2011/0079145 A1 | | 4/2011 | Dolan et al. |
| 2017/0145129 A1 | | 5/2017 | Reed et al. |

FOREIGN PATENT DOCUMENTS

| | | |
|---|---|---|
| WO | 2004/033507 A1 | 4/2004 |
| WO | 2008/010962 A2 | 1/2008 |
| WO | 2008/013519 A2 | 1/2008 |
| WO | 2009/010666 A2 | 1/2009 |

OTHER PUBLICATIONS

Yu G. Osokin, Petroleum Chemistry (2008), pp. 71-82, vol. 48.
Fachinetti et al., J. Chem. Soc. Dalton (1977) pp. 1946-1950.
Michael Hill et al.: Reactivity of Carbon Dioxide toward Zirconocene Cations Hill, Organometallics (2005), pp. 5772-5775, vol. 24, No. 23.
I. S. Kolomnikov et al.: Reaction of Carbon Dioxide with Diphenyltitanocene and X-Ray Crystal Structure of the Product, Chemical Communications (1971), pp. 972-973.
Johnson, Magnus T., Journal of Organometallic Chemistry (2014) 751, pp. 213-220.
Helmut G. et al., Journal of Organometallic Chemistry (1990), 390(1), 5, pp. 3-60.
Yasuda et al.: Diverse reaction courses in the controlled carbometalation of heterocumulenes with zirconium-diene complexes and molecular structures of carbon dioxide, isocyanate and ketene 1:1 and 1:2 inserted compounds, Organometallics (1989), pp. 1139-1152, vol. 8, No. 5.
Santhosh K. Podiyanachari et al.: Catalytic Formation of Five-Membered Zirconacycloallenoids and Their Reaction with Carbon Dioxide Podiyanachari, Organometallics (2014), 33(13), pp. 3481-3488.

* cited by examiner

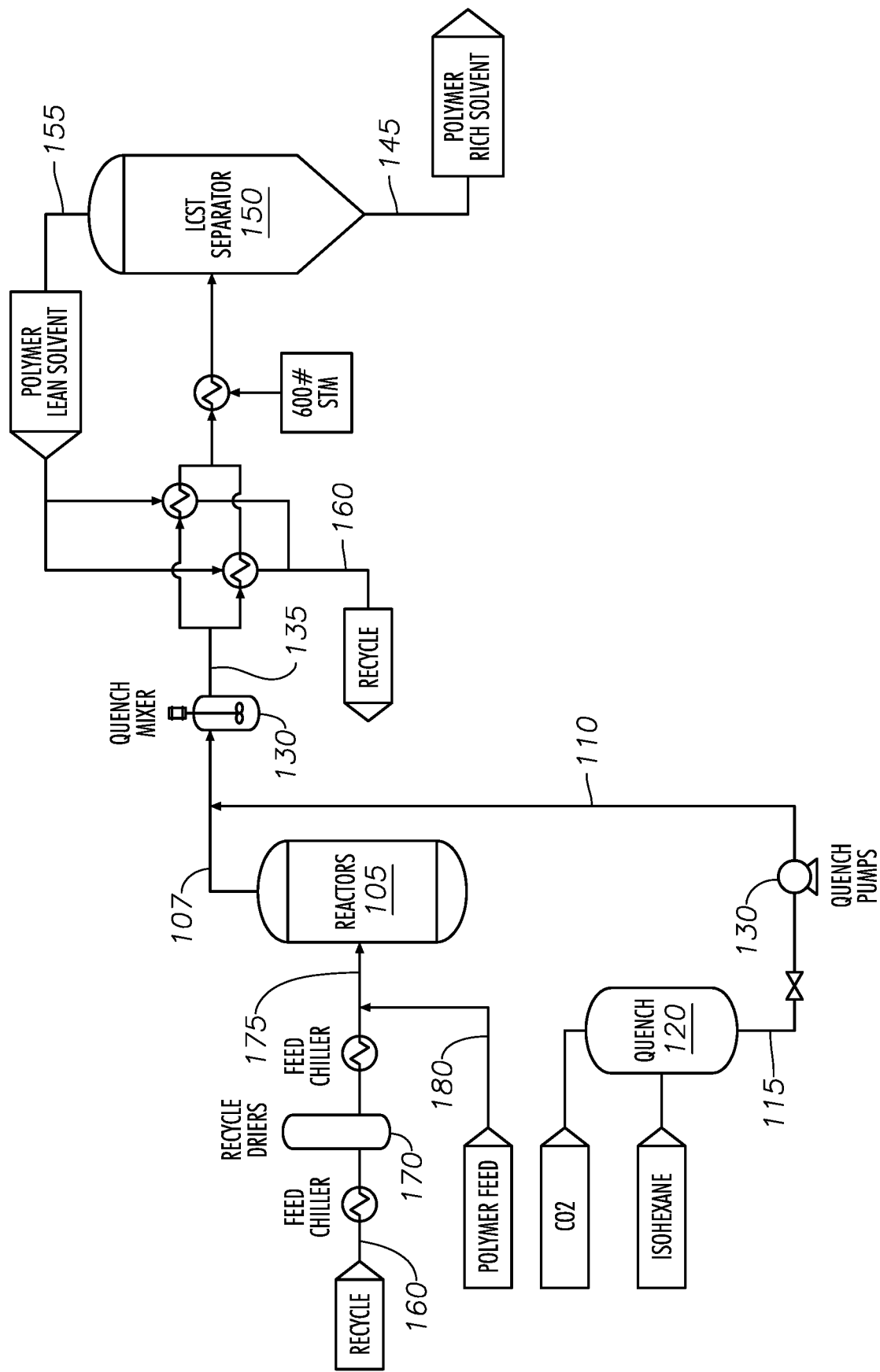

CARBON DIOXIDE AS A CATALYST QUENCH AGENT IN SOLUTION POLYMERIZATION, AND PRODUCTS MADE THEREFROM

PRIORITY CLAIM

This application is a National Phase Application claiming priority to PCT Application Serial No. PCT/US2018/040837, filed Jul. 5, 2018, which claims priority to and the benefit of U.S. Ser. No. 62/551,380, filed Aug. 29, 2017 and EP 17202252.7, filed Nov. 17, 2017 and are incorporated by reference in their entirety.

FIELD OF THE INVENTION

The present disclosure relates to solution polymerization for making polyolefins. More particularly, embodiments provided herein relate to carbon dioxide as a quench agent for metallocene catalysts after polymerization.

BACKGROUND OF THE INVENTION

Catalyst quench is a conventional step in a polymerization process, especially solution polymerization. The effluent leaving the polymerization reactor typically includes still-active catalyst that continue to polymerize monomer. Such post reactor polymerizations are a large cause of contamination in the polymer product because the polymer produced downstream of a polymerization reactor are polymerized under conditions (e.g., temperature, pressure, and/or monomer concentration) different from the controlled conditions of the polymerization reactor. Such polymers produced under different conditions typically have molecular weight and composition different than the bulk polymer produced in the intended polymerization reaction zone. These contaminant polymers can cause many problems, including fouling in conduits and units downstream of the reactor, or they can result in surface defects in products made from the polymer product. For instance, copolymer elastomers, such as ethylene-α-olefin-polyene elastomers (e.g., ethylene-propylene-diene or EPDM rubbers) can be formed into articles, such as extruded weather seals. Such articles may contain areas of polymer with different physical properties from the bulk product, and manifest as a defect in the article.

Quenching agents are frequently added just downstream of a polymerization reaction zone in an attempt to address this problem. Quenching agents are compounds that react with polymerization catalysts to deactivate the catalysts, thereby inhibiting any undesired downstream polymerization reactions.

Some references of potential interest with regard to this problem include: U.S. Pat. Nos. 2,653,959; 2,943,105; 3,489,808; 3,931,350; 4,337,156; 5,245,107; 5,326,855; 5,427,689; 6,051,631; 6,111,162; 6,118,037; 6,632,766; 6,790,344; 6,987,152; 7,102,044; 7,141,630; 7,141,631; 7,326,821; 7,368,618; 7,576,248; and 9,382,344; U.S. Patent Application Publication Nos. 2002/147377; 2004/0254416; 2009/0312511; 2010/0197989; and 2011/0079145; European Patent Application Publication No. 1022056A; PCT Publication Nos. WO 2002/06188; WO 2004/033507; WO 2008/010962; WO 2008/013519; and WO 2009/010666; and Yu G. Osokin, 47, PETROLEUM CHEMISTRY, pp. 1-11 (2007), and 48, PETROLEUM CHEMISTRY, pp. 271-82 (2008).

Quenching agents, however, react with the catalyst and the co-catalyst/activator, such as aluminum alkyls. Unfortunately, these reactions lead to inorganic precipitates that settle in various parts of the downstream process units.

There is a need, therefore, for new quench agents that do not react with the polymerization catalysts to form inorganic precipitates.

SUMMARY OF THE INVENTION

Disclosed herein is a method for making a polymer, including the steps of (a) polymerizing one or more monomers in the presence of a solvent and a catalyst to form a reaction product; (b) removing an effluent from the reaction product, wherein the effluent comprises an active catalyst and one or more unreacted monomers; (c) combining a quench, comprising carbon dioxide with the effluent to form a quenched polymer stream, comprising a carboxyl metal complex; and (d) recovering a polymer from the quenched polymer stream.

BRIEF DESCRIPTION OF THE DRAWING

The FIGURE shows an illustrative solution polymerization reaction system in accordance with one or more embodiments provided herein.

DETAILED DESCRIPTION

Described herein are various embodiments, including embodiments relating to a process for polymerization, and in particular solution polymerization. Such a process may include feeding one or more monomers and a polymerization solvent to a polymerization reaction zone, polymerizing at least a portion of the one or more monomers in the presence of a polymerization catalyst in the polymerization reaction zone, withdrawing a polymerization effluent from the reaction zone, and adding a quenching agent to the polymerization effluent to obtain a quenched polymer stream.

Surprisingly, it has been found that carbon dioxide makes for an excellent quenching agent, particularly in a solution polymerization process. Carbon dioxide has been discovered to prevent insoluble components, such as inorganic precipitates, when used as a quench agent in solution polymerization. It has been discovered that carbon dioxide reacts via an insertion mechanism to form a carboxyl metal complex where the metal is covalently bonded to the polymer chain. It has been further discovered, unexpectedly, that such carboxyl metal complex is soluble in the polymerization effluent. An illustrative schematic of this insertion mechanism is as follows. The schematic below shows two oxygens bonded to the Hf center. In an embodiment, one oxygen may be bonded to the Hf center.

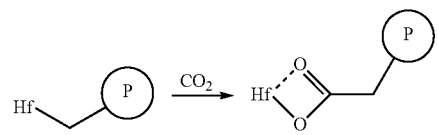

The one or more monomers can be selected from α-olefin monomers and/or polyene monomers. Preferably, the one or more monomers are independently selected from C2-C40 α-olefins, preferably C2 to C20 α-olefins, more preferably C2 to C12 α-olefins (e.g., ethylene, propylene, butene, pentene, hexene, heptene, octene, nonene, decene, undecene, dodecene and isomers thereof). Preferably, the C2 to C40 α-olefin and cyclic olefin monomers and comonomers include ethylene, propylene, butene, pentene, hexene, heptene, octene, nonene, decene, undecene, dodecene, norbornene, cyclopentene, cycloheptene, cyclooctene, cyclododecene, 7-oxanorbornene, substituted derivatives thereof, and isomers thereof, preferably hexene, heptene, octene, nonene, decene, dodecene, cyclooctene, 1-hydroxy-4-cyclooctene, 1-acetoxy-4-cyclooctene, 5-methylcyclopentene, cyclopentene, and any combination thereof.

The one or more monomers may include a first C2-C12 α-olefin and a second C2-C12 α-olefin that is different from the first. The first monomer can be ethylene, and the second monomer can be an α-olefin other than ethylene. For instance, the second monomer can be a C3-C12 α-olefin or C3-C8 α-olefin, such as one of those identified above. In particular embodiments, the second monomer is propylene, butene (e.g., 1-butene), or hexene (e.g., 1-hexene). In yet further embodiments, the one or more monomers includes both propylene and butene in addition to the ethylene.

The one or more monomers may further include one or more polyenes. Suitable polyene monomers include any hydrocarbon structure, preferably C4 to C30, having at least two unsaturated bonds. Preferably, the polyene is a non-conjugated diene with at least two unsaturated bonds, wherein one of the unsaturated bonds is readily incorporated into a polymer. The second bond may partially take part in polymerization to form cross-linked polymers but normally provides at least some unsaturated bonds in the polymer product suitable for subsequent functionalization (such as with maleic acid or maleic anhydride), curing or vulcanization in post polymerization processes. Examples of dienes include, but are not limited to butadiene, octadiene, decadiene, hexadiene, and other C7 to C30 alkenes, as well as polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to, dicyclopentadiene, and alkenyl alkylidene, cycloalkylenyol, and cylcoalkylidene norbornenes [including, e.g., 5-methylene-2-norbornene, 5-ethylidene-2-norbornene (ENB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB)]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. 5-ethylidene-2-norbornene (ENB), which has two unsaturated bonds (but only one of which is polymerizable) is a preferred diene in particular embodiments. During polymerization, ENB is incorporated into a growing polymer chain through the endocyclic double bond only; leaving the exocyclic double bond unreacted. Since it is unreactive during the polymerization, no reactor crosslinking can occur. The unreacted double bond is available for use (e.g., crosslinking and functionalization) post-reactor. Thus, polymer compositions of some embodiments are free of polyenes having >1 polymerizable unsaturated bond.

Diene monomers, as utilized in yet other embodiments, have at least two polymerizable unsaturated bonds that can readily be incorporated into polymers to form cross-linked polymers. A polymerizable bond of a diene is referred as to a bond which can be incorporated or inserted into a polymer chain during the polymerization process of a growing chain. For polymerization using metallocene catalysts, examples of such dienes include ocm-dienes (such as butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene) and certain multi-ring alicyclic fused and bridged ring dienes (such as tetrahydroindene; 7-oxanorbornadiene, dicyclopentadiene; bicyclo-(2.2.1)-hepta-2,5-diene; 5-vinyl-2-norbornene (VNB); 3,7-dimethyl-1,7-octadiene; 1,4-cyclohexadiene; 1,5-cyclooctadiene; 1,7-cyclododecadiene and vinyl cyclohexene). The content of diene with at least two polymerizable bonds in a polymer composition according to some embodiments is less than 0.5 wt %, preferably less than 0.1 wt % of the polymer composition.

Copolymers and copolymer compositions formed from monomers comprising both ethylene and propylene may in general be characterized as ethylene-propylene (EP) copolymers. Such copolymers may optionally include units derived from a diene monomer, as well, such that polymers formed according to such embodiments can be designated as EP(D)M polymers, indicating the optional inclusion of diene-derived units. Where such diene-derived units are present, the copolymer is more particularly characterized as an EPDM copolymer. Furthermore, EP(D)Ms and/or EPDMs according to some embodiments can be formed from a plurality of monomers including another α-olefin comonomer, such as 1-butene, in addition to the propylene comonomer.

Thus, according to some preferred embodiments, the one or more monomers can include ethylene, propylene, and, optionally, one or more dienes. In some embodiments, the monomers consist essentially of ethylene, propylene, and, optionally, one or more dienes. In particular embodiments, the monomers are ethylene, propylene, and a diene (such as ENB). In such embodiments, the diene content is less than 15 wt %, 10 wt %, 5 wt %, 1 wt %, or 0.1 wt % of the ethylene terpolymer.

Catalyst

Suitable metallocene catalysts include a catalyst that is a bridged fluorenyl-cyclopentadienyl group 4 catalyst (and/or Cp-fluorenyl variants), mono-Cp amido group 4 catalyst (and/or mono-Cp amido variants), biphenyl phenol (BPP) transition metal catalyst, pyridyl amide transition metal catalyst and/or pyridyl diamide transition metal catalyst.

Particularly preferred metallocene catalysts according to some embodiments include fluorenyl-cyclopentadienyl group 4 catalysts represented by formula (I):

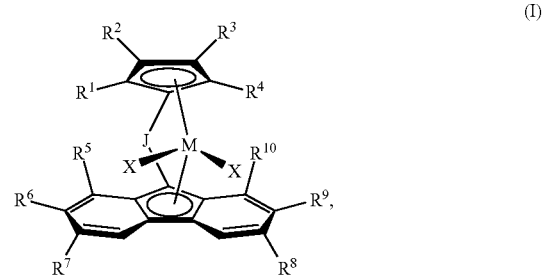

where: J is a divalent bridging group (preferably comprising C, Si, or both);

M is a group 4 transition metal (with Hf being preferred in certain embodiments);

each X is independently a univalent anionic ligand, or two Xs are joined together to form a metallocycle ring with M, or two Xs are joined to form a chelating ligand, a diene ligand, or an alkylidene ligand; and each $R^1$, $R^2$, $R^3$, $R^4$, $R^5$, $R^6$, $R^7$, $R^8$, $R^9$, and $R^{10}$ is independently hydrogen, $C_1$-$C_{50}$ substituted or unsubstituted alkyl (preferably unsubstituted $C_1$-$C_{10}$ alkyl, more preferably $C_1$-$C_5$ alkyl), provided that any one or more of the pairs $R^1$ and $R^2$, $R^3$ and $R^4$, $R^5$ and $R^6$, $R^6$ and $R^7$, $R^8$ and $R^9$, and $R^9$ and $R^{10}$, may optionally be bonded together to form a saturated or partially saturated cyclic or fused ring structure. Both the activated and un-activated (precursor) forms of the compound represented by formula (I) are embraced by formula (I).

In at least one embodiment, J is a bridging group comprising carbon and/or silicon atoms, such as dialkylsilyl; preferably J is selected from —$CH_2$—, —$CH_2CH_2$—, —$C(CH_3)_2$—, —$SiMe_2$-, —$SiEt_2$-, —$SiPh_2$-, —$Si(Me)(C_6H_5)$—, —$C(Ph)_2$-, —$C(p\text{-}(Et)_3SiPh)_2$-, —$C(Si(Et)_3)_2$-, $(CH_2)_3Si$=, $(CH_2)_4Si$=, and $(CH_2)_5Si$=, where Me is methyl, Et is ethyl, and Ph is phenyl, and further where each $(CH_2)_xSi$= indicates a cyclic silylene moiety having x carbons and the silicon atom in the cyclic group, e.g., where x is 4 in such compounds, J is cyclotetramethylenesilylene.

In at least one embodiment, $R^6$ and $R^9$ are each $C_1$ to $C_4$ alkyl, preferably $C_4$ alkyl such as tert-butyl; $R^1$-$R^4$, $R^5$, $R^7$, $R^8$, and $R^{10}$ are each independently methyl, ethyl, or H (preferably, each is H); J is selected from any of the groups described above (preferably J is (p-$(Et)_3SiPh)_2C$); M is Hf; and each X is independently $C_1$-$C_3$ alkyl or a halide (preferably each X is methyl).

A particularly preferred fluorenyl-cyclopentadienyl group 4 catalyst according to some embodiments is 1,1'-bis(4-triethylsilylphenyl)methylene-(cyclopentadienyl)(2,7-di-tertiary-butyl-fluoren-9-yl) hafnium dimethyl.

Activators

The terms "cocatalyst" and "activator" can be used interchangeably and include any compound which can activate any one of the catalyst compounds described above (including either or both of the first and second metallocene catalyst compounds) by converting the neutral catalyst compound ("un-activated") to a catalytically active catalyst compound cation ("activated"). Suitable activators are described in Paragraphs [0110]-[0115] of PCT Publication No. WO 2016/114914 A1, which description is herein incorporated by reference; and/or in Paragraphs [0110]-[0133] of U.S. Patent Publication No. 2015/0025209, which description is incorporated by reference herein.

Particularly useful activators in some embodiments of the present disclosure include non-coordinating anion (NCA) activators, such as those in Paragraph [0124] of U.S. Patent Publication No. 2015/0025209, and also those in Columns 7 and 20-21 in U.S. Pat. No. 8,658,556, which description is incorporated by reference. Particular examples of suitable NCA activators include: N,N-dimethylanilinium tetrakis(pentafluorophenyl)borate, N,N-dimethylanilinium tetrakis(perfluoronaphthyl)borate, N,N-dimethylanilinium tetrakis(perfluorobiphenyl)borate, triphenylcarbenium tetrakis(perfluoronaphthyl)borate, bis($C_4$-$C_{20}$alkyl) methylammonium tetrakis (perfluoronaphthyl)borate, $Me_3NH^+$ tetrakis(pentafluorophenyl)borate, $Me_3NH^+$ tetrakis(heptafluoro-2-naphthyl)borate, and bis(hydrogenated tallowalkyl)methylammonium tetrakis(pentafluorophenyl)borate. A particularly preferable NCA activator is N,N-dimethylanilinium tetrakis(pentafluorophenyl)borate.

A catalyst of the present disclosure can be activated on-line in the catalyst feed line or in the polymerization reactor. Furthermore, an activator-to-catalyst molar ratio is from 0.1:1 to 1000:1, such as from 0.5:1 to 100:1, such as 2:1 to 50:1. A preferred molar ratio is 1:1.

In some embodiments, the activator(s) is/are contacted with a catalyst compound to form the catalyst system comprising activated catalyst and activator and/or other charge-balancing moiety, before the catalyst system is contacted with one or more monomers to form an EPDM terpolymer. In other embodiments, the activator can be co-fed together with one or more monomers into a reactor having catalyst in the reactor. Preferably, the catalyst is contacted with the activator before being fed into the polymerization reaction zone of a reactor.

As used herein, a "catalyst system" is a combination of different components that, taken together, provide the active catalyst. A catalyst system, therefore, includes at least a transition metal compound (also referred to herein as "catalyst," "precatalyst," or "catalyst precursor") and an activator. An activator is sometimes referred to as a "co-catalyst". The activator activates the transition metal compound and converts it into its catalytically active form. For example, an activator converts a neutral metallocene compound into its cationic form, which is the catalytically active species. When the term "catalyst system" is used to describe a catalyst/activator pair before activation, it refers to the unactivated catalyst (i.e., the precatalyst) together with an activator. When this term is used to describe a catalyst/activator pair after activation, it refers to the activated catalyst and the charge-balancing anion derived from the activator or other charge-balancing moiety. The components of the catalyst system may, either separately or jointly, be supported on a solid support, such as alumina or silica.

Optional Scavengers or Co-Activators

In addition to the activator compounds, scavengers or co-activators can be used in conjunction with the first and second metallocene catalysts in a polymerization reaction zone. A "scavenger" is a compound that is typically added to facilitate polymerization by scavenging impurities (poisons that would otherwise react with the catalyst and deactivate it). Some scavengers may also act as activators, and they may also be referred to as co-activators. A co-activator can be used in conjunction with an activator in order to form an active catalyst.

Suitable scavengers can be or can include one or more aluminum alkyl or organoaluminum compounds. Suitable organoaluminum compounds can include, for example, trimethylaluminum, triethylaluminum, triisobutylaluminum, tri-n-hexylaluminum, tri-n-octylaluminum and the like. Other oxophilic species such as diethyl zinc can be used.

Polymerization Solvent

The polymerization solvent or diluent can be an organic liquid, preferably a liquid hydrocarbon, such as isohexane, hexane, cyclohexane, or other suitable hydrocarbon solvents for polymerization processes.

Adding Quenching Agent to Polymerization Effluent

The polymerization effluent according to some embodiments includes the polymer product (e.g., ethylene-propylene copolymer, where the one or more monomers include ethylene and propylene; or, e.g., EPDM copolymer, where the one or more monomers include ethylene, propylene, and one or more dienes); active polymerization catalyst; unreacted monomers (selected from the one or more monomers polymerized in the solution polymerization process); and polymerization solvent.

As shown in the FIGURE, the quenching agent (i.e. carbon dioxide) can be added to the process to deactivate the polymerization catalyst downstream of the reactors 105. The polymerization effluent 107 exiting the reactor(s) 105 can be mixed with a quench agent stream 110. The quenching agent, i.e. carbon dioxide, can be provided from a tank 120 via stream 115 and pumped as a quench agent stream 110 to the polymerization effluent 105 using one or more quench pumps 130. Any suitable solvent, such as those mentioned herein, can be added to the quench storage tank 120, and can be used as a carrier for the carbon dioxide quench agent. Isohexane, for example, is a suitable carrier. Optionally, as shown in The FIGURE, the combined polymerization effluent and quenching agent can be sent to a quench mixer 130, to provide additional mixing to enhance the quenching reaction.

As mentioned above, carbon dioxide makes for an excellent quenching agent, particularly in a solution polymerization process. Carbon dioxide reacts via an insertion mechanism with the polymerization catalyst to form a carboxyl metal complex that is covalently bonded to the polymer chain. In one embodiment of the invention, the quench is free of water. In another embodiment of the invention, the quench is free of methanol. Preferably, the quench consists essentially of solvent and carbon dioxide. As used herein, the term "free" means having less than about 1 wt % based on the total weight of the quench. The resulting carboxyl metal complex is soluble in the polymerization effluent, which leads to significantly less fouling in the post-reactor processing units. An illustrative schematic of this insertion mechanism is as follows:

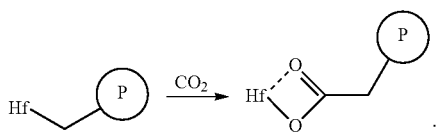

Although Hafnium is shown in the illustrative schematic, the Hafnium could be replaced by any group 3 to 6 metal, preferably a group 4 metal.

In some embodiments, carbon dioxide may be used in combination with small amounts water, alcohols, or other polar molecules.

Separation, Recycle, and Adsorbents

Some embodiments further include recovering solid polymer product from the quenched polymer stream. In embodiments where the quenched polymer stream includes one or more oxygenates (whether unreacted quenching agent, products of acid-catalyzed reaction with dienes, or both), the solid polymer product may be recovered by further separating the quenched polymer stream into a polymer product stream and a polymer recycle stream; and contacting at least a portion of the polymer recycle stream with one or more adsorbent beds to produce a treated recycle stream. The treated recycle stream may then be sent to the polymerization reaction zone. The polymer product stream can be subjected to further separations, e.g., devolatilization, so as to recover the solid polymer product. Any suitable devolatilization process can be utilized, such as extruder devolatilization, vacuum devolatilization, kneader devolatilization, and the like. See, e.g., U.S. Pat. Nos. 6,881,800 and 8,524,859; U.S. Patent Publication No. US2011/0172383; and WIPO Publication No. WO2011/087730 for descriptions of some suitable devolatilization processes and equipment. In some preferred embodiments, devolatilization is carried out using a kneader, such as that described in U.S. Pat. No. 8,524,859.

The separation of the quenched polymer stream can be done by any suitable technique, and preferably results in a polymer-rich stream 145 and a polymer-lean stream 155. One suitable technique for such separation includes lower critical solution temperature (LCST) separation, such as is taught in U.S. Pat. No. 6,881,800. As shown in the FIGURE, the quenched polymer stream 135 is separated using an LCST separator 150, from which exit the polymer recycle stream 155 (as the polymer-lean phase) and the (polymer-rich) polymer product stream 145. Optionally, heat exchange can be provided on the quenched polymer stream 135 prior to separation. Such heat exchange may helpfully put the polymer stream in conditions more suitable to separation into the polymer-rich and polymer-lean phases (e.g., cooler temperatures closer to or at the cloud point of the quenched polymer stream). Furthermore (also not shown in the FIGURE), the polymer product stream 155 can be passed to devolatilization (e.g., a kneader, devolatilization extruder, vacuum devolatilizer, or other suitable devolatilization systems).

Still referring to the FIGURE, the polymer recycle stream can be contacted with one or more adsorbent beds 170 to produce the treated recycle stream 175, which may then be combined with a polymer feed stream 180, comprising the one or more monomers, and fed to the polymerization reactor 105. (Alternatively, not shown in the FIGURE, the treated recycle stream can be provided directly to the polymerization reactor 105, separately from the feed stream 180.)

The one or more adsorbent beds 170 can include a zeolitic molecular sieve and/or a hybrid zeolite in alumina. According to some embodiments, a zeolitic molecular sieve is desirable for removing water and lower oxygenates (e.g., $C_1$ to $C_6$ oxygenates), while the hybrid zeolite in alumina is desirable for removing higher oxygenates, such as $C_8$ to $C_{40}$ oxygenates, or $C_{12}$ to $C_{30}$ oxygenates, most preferably $C_{18}$ oxygenates. Any of the zeolitic molecular sieves and/or hybrid zeolite in alumina adsorbent beds described in Paragraphs [0030]-[0036] of WIPO Patent Publication WO2014/209813 (corresponding to U.S. Pat. No. 9,382,344, noted previously) can be suitable for use in treating the recycle stream of such embodiments. Such description is accordingly incorporated by reference herein.

For instance, as noted in WO2014/209813, a suitable zeolitic molecular sieve may comprise material selected from the group consisting of zeolite X, zeolite Y, zeolite A, faujasite, mordenite, ferrierite, and mixtures thereof. Zeolitic molecular sieves for removing water are well known in the art and are available from, for example, BASF and other manufacturers. The zeolitic molecular sieves preferably have a pore size within the range of from 2 or 4 Å to 6 or 8 or 10 or 12 Å, where desirable ranges may include ranges from any lower limit to any upper limit.

The "hybrid zeolite in alumina" can be a zeolite that is in a matrix of alumina. The hybrid zeolite in alumina may have a surface area within the range of from 60 or 80 $m^2/g$ to 110 or 120 or 140 $m^2/g$, where desirable ranges may include ranges from any lower limit to any upper limit. The hybrid zeolite in alumina may have a pore volume within the range from 0.30 or 0.35 or 0.40 ml/g to 0.48 or 0.50 or 0.54 ml/g, where desirable ranges may include ranges from any lower limit to any upper limit. A commercial example of a useful hybrid zeolite in alumina is zeolite UOPAZ300™ from UOP.

In some embodiments, at least one of the adsorbents is binderless. For example, the zeolitic molecular sieve can be binderless and/or the hybrid zeolite in alumina can be binderless. A binderless zeolite is a zeolite that contains less than 10 wt % binder, or less than 7 wt % binder, or less than 5 wt % binder, or less than 2 wt % binder, where the binder content of the zeolite is measured by X-ray diffraction. In some embodiments, the zeolite is substantially free of binder and contains less than 2 wt % binder. Using a binderless zeolite can allow for the creation of less oxygenates in the recycle stream, as the unreacted conjugated or non-conjugated diene monomer in the recycle stream and quenching agents, can react with the binder in a zeolitic material to form oxygenates. Further, in addition to the benefit that substantially no oxygenates are generated by the (binder) in the zeolite body, using a binderless zeolite can provide increased capacity per weight of the material for removing water/quenching agent. An example of a binderless zeolite that can be used is Zeochem Purmol® 3ST and Zeochem Purmol® 3STH.

The following test methods are used to determine the properties reported herein:

Gel Permeation Chromatography (GPC). Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated (with polystyrene standard), are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples. As used herein, the term "room temperature" is used to refer to the temperature range of about 20° C. to about 23.5° C.

The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c,$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_O = \frac{4\pi^2 n^2 (dn/dc)^2}{\lambda^4 N_A},$$

in which $N_A$ is the Avogadro's number, and dn/dc is the retractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i),$$

since the weight fraction $w_i$ is defined as the weight of molecules of molecular weight $M_i$ divided by the total weight of all the molecules present:

$$w_i = N_i M_i / \Sigma N_i M_i.$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i,$$

since the mole fraction $x_i$ is defined as $N_i$ divided by the total number of molecules:

$$x_i = N_i / \Sigma N_i.$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the following equation:

$$\eta_S = c[\eta] + 0.3(c[\eta])^2,$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i},$$

where the summations are over the chromatographic slices, i, between the integration limits.

The branching index g' is defined as:

$$g' = \frac{[\eta]_{avg}}{kM_v^\alpha},$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \Sigma c_i)^{1/\alpha}.$$

Differential Scanning Calorimetry (DSC)

Heat of fusion and melting point ($T_M$) values are determined by Differential Scanning Calorimetry (DSC) in accordance with the following procedure. From about 6 mg to about 10 mg of a sheet of the polymer pressed at approximately 200° C. is removed with a punch die. This is annealed at room temperature (about 23° C.) for at least 2 weeks. At the end of this period, the sample is placed in a Differential Scanning Calorimeter (TA Instruments Model 2920 DSC) and cooled at a rate of 10° C./min to about −50° C. The sample is heated at a rate of 10° C./min to attain a final temperature of about 200° C. The thermal output during this heating is recorded. The melting point is recorded as the temperature of the greatest heat absorption within the range of melting of the sample.

The various descriptive elements and numerical ranges disclosed herein for the polymerization process, and in particular, the method of removing oxygenates and water from the recycle stream, and the adsorbents used therein, can be combined with other descriptive elements and numerical ranges to describe the invention(s); further, for a given element, any upper numerical limit can be combined with any lower numerical limit described herein. The features of the invention are described in the following non-limiting examples.

EXAMPLES

A series of experiments were conducted to explore the quenching ability of carbon dioxide on metallocene catalyzed EPDM copolymers, as compared to water ($H_2O$) and methanol (MeOH) as quench agents. In the Examples below, the metallocene catalyst was 1,1'-bis(4-triethylsilylphenyl) methylene-(cyclopentadienyl)(2,7-di-tertiary-butyl-fluoren-9-yl) hafnium dimethyl (hereafter the "CAT"); the activator was N,N-dimethylanilinium tetrakis (pentafluorophenyl) borate (hereafter the "ACT"); and the scavenger was tri-n-octylaluminum (TNOA).

In Examples 1-2, the EPDM copolymer was VN5601, and in Examples 3-8, the EPDM copolymer was VN6602, both of which are commercially available from ExxonMobil Chemical Company and sold under the name VISTALON™ polymers. VN5601 is an ethylene propylene diene terpolymer having a mooney viscosity (ML 1+4, 125° C.) of about 72, an ethylene content of about 69 wt %, and an ethylidene norbornene (ENB) content of about 5 wt %. VN6602 is an ethylene propylene diene terpolymer having a mooney viscosity (ML 1+4, 125° C.) of about 80, an ethylene content of about 55 wt %, and an ethylidene norbornene (ENB) content of about 5.2 wt %.

Polymer Prep for Examples 1 and 2

Samples of VN5601 (14.85 grams) were placed in a round bottom flask. Isopar M (170 mL), dried over sieves and degassed, was added and the mixture was heated to 130° C. for 2 hours with a bag full of activated 3A molecular sieves suspended over the solution. After 2 hours, the solid chunks of the VN5601 were partially dissolved. The temperature was raised to 150° C. and the sieves were replaced with fresh sieves. After several hours the sieves were changed again and the solution was left stirring overnight at 150° C., resulting in a clear solution. Total weight of the solution was 125.2 g resulting in approximately 11.9 wt % of VN5601 copolymer, based on the total weight of the solution.

Catalyst Prep

The catalyst system was made by dissolving the metallocene (1,1'-bis(4-triethylsilylphenyemethylene-(cyclopentadienyl) (2,7-di-tertiary-butyl-fluoren-9-yl) hafnium dimethyl) in toluene, adding the activator (N,N-dimethylanilinium tetrakis(pentafluorophenyl) borate) in solid form and shaking vigorously. TNOA was then added. The solution was a dark red/burgundy color after TNOA addition.

Example 1

A solution of CAT/ACT in toluene was treated with $CO_2$ by bubbling it through the solution for several minutes. This solution was added to the VN5601 solution at room temperature (about 23° C.) and heated to 200° C. with the vial open to allow evaporation of toluene. The cap was replaced after about an hour. There was no obvious increase in viscosity. The solution was heated over the weekend at 200° C. There was no obvious increase in viscosity, indicating that the catalyst activity had been quenched since no crosslinking of the EPDM was observed.

TABLE 1

| Polymer soln (g) | Polymer (wt %) | Polymer (g) | CAT (g) | CAT/ACT (mL) | CAT (mmol) | ACT (mmol) | Temp ° C. | CAT wt % (wt %) |
|---|---|---|---|---|---|---|---|---|
| 5.15 | 11.9 | 0.61 | 0.0330 | 4 | 0.0350 | 0.0350 | 200 | 0.64 |

Example 2

In this example, the catalyst solution was made by combining 96 mg of CAT in about 1 mL toluene with 82 mg of ACT in about 1 mL of toluene and 0.5 ml of 1-hexene. This was allowed to sit for 30 min, forming a dark burgundy solution that was slightly cloudy, with some precipitate. $CO_2$ was bubbled through the solution for about 3 minutes forming an orange solution. This solution was added to the VN5601 solution at room temperature (about 23° C.) and mixed with a spatula. The vial was heated up to 200° C. with the vial open to allow the toluene to evaporate. After 30 min, the solution was dark orange showing no obvious sign of crosslinking. The vial was capped and allowed to stir overnight at room temperature (about 23° C.). A small amount of solid adhered to the side of the vial at the gas/liquid interface, but there was no obvious crosslinking.

TABLE 2

| Polymer soln (g) | Polymer (wt %) | Polymer (g) | CAT (g) | CAT/ACT (mL) | ACT (mg) | Temp ° C. | CAT wt % (wt %) |
|---|---|---|---|---|---|---|---|
| 6.29 | 11.9 | 0.75 | 96 | 4 | 82 | 200 | 1.53 |

Examples 3-8

Samples of VN6602 (21.5 grams) were placed in a round bottom flask and octane (250 mL; dried over sieves and degassed) was added. The flask was heated to 110° C. causing the solid VN6602 to dissolve over 6 hours. The solution was heated overnight (about 16 hrs) with a bag full of activated 3A molecular sieves suspended over the solution. The temperature was increased to 140° C. and a slow stream of $N_2$ was passed through the solution, after about 3 hours there was no visible water. The octane was distilled off under vacuum with a bath temp of 140° C. After nearly all the octane/volatiles were removed, the bath temperature was lowered to 100° C. and the flask opened completely to vacuum for 1 hr. The resulting polymer yield was about 18 grams.

Solid CAT was weighed out and dissolved in toluene then solid ACT was added to the solution and shaken vigorously. TNOA was then added to this solution followed by thorough mixing. The amounts of each reagent used is shown in the table below. Total CAT was 0.046 g/mL.

TABLE 3

| Example | CAT (g) | ACT (g) | CAT (mmol) | ACT (mmol) | toluene (mL) | total volume (mL) | TNOA (mmol) | TNOA (mg) | TNOA (mL) |
|---|---|---|---|---|---|---|---|---|---|
| 3 | 0.22 | 0.18 | 0.22 | 0.22 | 3.67 | 4.55 | 1.11 | 406 | 0.49 |
| 4 | 0.19 | 0.17 | 0.21 | 0.21 | 3.47 | 4.31 | 1.05 | 385 | 0.47 |
| 5 | 0.25 | 0.22 | 0.27 | 0.27 | 4.46 | 5.52 | 1.35 | 493 | 0.60 |
| 6 | 0.18 | 0.15 | 0.19 | 0.19 | 3.09 | 3.83 | 0.93 | 342 | 0.41 |
| 7 | 0.16 | 0.14 | 0.17 | 0.17 | 2.86 | 3.54 | 0.86 | 317 | 0.38 |
| 8 | 0.24 | 0.20 | 0.25 | 0.25 | 4.21 | 5.22 | 1.27 | 466 | 0.57 |

Solutions of VN6602 in Isopar M were made by adding the dried VN6602 to Isopar M in the quantities specified in the Table below. The samples were then heated with stirring to either 100° C. for overnight or 200° C. long enough to dissolve the VN6602 in the Isopar M.

TABLE 4

| Example | VN6602 soln (g) | VN6602 (g) | Isopar M (mL) | CAT/solution (wt %) | CAT (g) | CAT/ACT (soln 1) (mL) | CAT (mmol) | ACT (mmol) |
|---|---|---|---|---|---|---|---|---|
| 3 | 20.7 | 1.94 | 23.9 | 0.200 | 0.041 | 0.901 | 0.044 | 0.044 |
| 4 | 18.0 | 1.69 | 20.8 | 0.100 | 0.018 | 0.392 | 0.019 | 0.019 |
| 5 | 19.1 | 1.82 | 22.0 | 0.050 | 0.010 | 0.208 | 0.010 | 0.010 |
| 6 | 21.7 | 2.05 | 25.0 | 0.200 | 0.043 | 0.944 | 0.046 | 0.046 |
| 7 | 21.7 | 2.05 | 25.0 | 0.500 | 0.109 | 2.360 | 0.115 | 0.115 |
| 8 | 19.9 | 1.85 | 23.0 | 0.500 | 0.100 | 2.167 | 0.106 | 0.106 |

Catalyst activity was determined by observation of the ability of the catalyst to cause cross-linking of the EPDM polymer (VN6602). Catalyst was added to the solutions of VN6602 in Isopar M and heated to the temperature and for the amount of time specified in the Table below. Cross-linking was determined by visual observation of the solutions.

TABLE 5

|  | Example | | | | | |
| --- | --- | --- | --- | --- | --- | --- |
|  | 3 CAT/ACT/ TNOA | 4 CAT/ACT/ TNOA | 5 CAT/ACT/ TNOA | 6 CAT/ACT/ TNOA | 7 CAT/ACT/ TNOA | 8 CAT/ACT/ TNOA |
| CAT/Solution | 0.20 wt % | 0.10 wt % | 0.05 wt % | 0.20 wt % | 0.50 wt % | 0.50 wt % |
| Quench | None | None | None | None | $CO_2$ | $CO_2$ |
| Time (h) | 2 | 2 | 2 | 2 | 2 | 2 |
| Temp (° C.) | 200 | 200 | 200 | 100 | 200 | 200 |
| Observed | crosslinked | crosslinked | solution | solution | solution | solution |

In examples 3 and 4, the catalyst solution was added to the VN6602 solution at 100° C. and 115° C. respectively and then the temperature was raised to 200° C. and held for 2 hours. During this time there was obvious crosslinking of the polymer and the viscosity increased substantially. The polymer samples were no longer soluble at this point.

In example 5, the catalyst solution was added to the VN6602 solution at 100° C., stirred for several minutes then the temperature raised to 200° C. and held at that temperature for 2 hours. There did not appear to be significant cross-linking.

In example 6, the catalyst solution was added to the VN6602 solution at 100° C. and held at that temperature for 2 hours. There did not appear to be significant cross-linking.

In example 7, the catalyst solution was added to the VN6602 solution at 100° C. and stirred for 5 minutes, then $CO_2$ was vigorously bubbled through the solution for about 5 minutes, there was no precipitate observed. The temperature was then raised to 200° C. and held at that temperature for 2 hours. After this time there was no precipitate observed. No cross-linking was observed.

In example 8, the catalyst solution was first reacted with $CO_2$ by vigorously bubbling $CO_2$ through the solution for about 5 minutes, there was no precipitate observed. The $CO_2$ treated catalyst solution was then added to the VN6602 solution at 100° C. stirred several minutes then the temperature was raised to 200° C. and held at that temperature for 2 hours. After this time there was no precipitate observed. No cross-linking was observed.

Comparative Example 1

Solid CAT was weighed out and dissolved in toluene then solid ACT was added to the solution and shaken vigorously. TNOA was then added to this solution followed by thorough mixing. The amounts of each reagent used is shown in the table below.

TABLE 6

| CAT (g) | ACT (g) | CAT (mmol) | ACT (mmol) | toluene (mL) | total volume (mL) | CAT (g/mL) | Al/Zr | TNOA (mmol) | TNOA (mg) | TNOA (mL) |
| --- | --- | --- | --- | --- | --- | --- | --- | --- | --- | --- |
| 0.219 | 0.186 | 0.232 | 0.232 | 3.84 | 4.76 | 0.046 | 5 | 1.16 | 425 | 0.516 |

The catalyst solution was added to the VN5601 solution in the amounts shown in the Table below. Temperature was 200° C. for both examples, and CAT/solution wt % was 1.0 wt % for both examples.

TABLE 7

| Example | VN5601 soln (g) | VN5601 (g) | CAT (g) | CAT/ACT (soln 1) (mL) | CAT (mmol) | ACT (mmol) | MeOH/ CAT (mol/mol) | MeOH (mg) |
| --- | --- | --- | --- | --- | --- | --- | --- | --- |
| CE-1 | 8.00 | 0.95 | 0.0800 | 1.740 | 0.0848 | 0.0848 | 30 | 81.4 |
| CE-2 | 8.81 | 1.05 | 0.0881 | 1.916 | 0.0933 | 0.0933 | 0 | 0 |

For CE-1 of Table 7, the catalyst solution was added to the polymer solution at room temperature (about 23° C.) and pooled on top. Methanol was added to the vial and reacted vigorously with the catalyst solution resulting in a color change from dark burgundy to yellow. The contents of the vial were mixed thoroughly with a spatula. The vial was heated to 200° C. resulting in the boiling of volatiles. After 15 minutes there was no obvious crosslinking, the solution was yellow and cloudy. There was no obvious change after heating for 1 hour, 2 hours and overnight (about 16 hours).

For CE-2 of Table 7, the catalyst solution was added to the polymer solution at room temperature (about 23° C.) and pooled on top. The contents were mixed vigorously with a spatula. The vial was heated to 200° C. resulting in the boiling of volatiles. After 15 minutes there was no obvious crosslinking, the solution was red/burgundy color. After 1 hour the viscosity was significantly increased and crosslinking was apparent. After 2 hours the material did not flow at all and remained a red/burgundy color.

The comparative examples show the methanol is an effective quench agent but can form a precipitate that can lead to fouling.

Analysis of the foulant showed that it contained hafnium and aluminum oxides, and cross-linked polymer. Without being bound by theory, it is believed that the inorganics are byproducts of the reaction between the metal and the quench agent. Below are generic reactions of a transition metal-polymer complex with reacting with $H_2O$ (top) and MeOH (bottom),

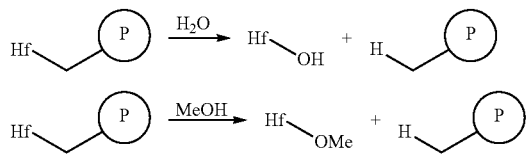

The initial stage of the reaction between TNOA and $H_2O$ is similar to the reactions shown above for the transition metal-polymer complex. Initial hydrolysis should occur, but secondary reactions will lead to additional hydrolysis reactions (presumably producing $AlR_x(OH)_y$ transiently and n-octane), which can then go on to react further to form different types of aluminas via dehydration reactions. These reactions, together with the hafnium catalyst, appear to make up the observed mixed metal oxides in the foulant. Below is a generic reaction scheme between $AlR_3$ with $H_2O$ and $CO_2$,

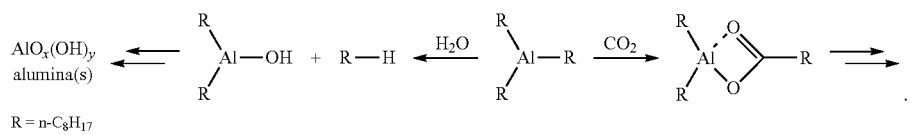

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A method for making a polymer, comprising:
   (a) polymerizing one or more monomers in the presence of a solvent and a catalyst to form a reaction product;
   (b) removing an effluent from the reaction product, wherein the effluent comprises an active catalyst and one or more unreacted monomers;
   (c) combining a quench, comprising carbon dioxide, with the effluent to form a quenched polymer stream comprising a carboxyl metal complex; and
   (d) recovering a polymer from the quenched polymer stream.

2. The method of claim 1, wherein the carboxyl metal complex is represented by the following complex,

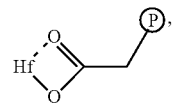

wherein Hf is the catalyst and P is the reaction product.

3. The method of claim 1, wherein the step (d) further comprises separating the quenched polymer stream into a polymer stream and a polymer recycle stream, wherein the polymer stream is separated from the polymer recycle stream to recover the polymer.

4. The method of claim 3, further comprising contacting at least a portion of the polymer recycle stream with an adsorbent bed comprising at least two adsorbents to produce a treated recycle stream.

5. The method of claim 1, wherein the one or more monomers comprises $C_2$-$C_{40}$ α-olefins or one or more polyenes.

6. The method of claim 1, wherein the one or more monomers comprise ethylene, propylene, and a diene.

7. The method of claim 4, wherein the adsorbent bed comprises a molecular sieve and a hybrid zeolite in alumina.

8. The method of claim 4, wherein the adsorbent bed further comprises at least one silica adsorbent.

9. The method of claim 7, wherein the molecular sieve comprises material selected from the group consisting of zeolite X, zeolite Y, zeolite A, faujasite, mordenite, ferrierite, and combinations thereof.

10. The method of claim 1, wherein the catalyst is represented by formula (I):

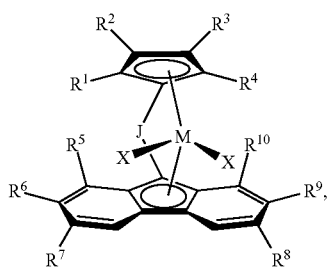

(I)

wherein:
- J is a divalent bridging group comprising carbon, silicon, or both;
- M is a group 4 transition metal;
- each X is independently a univalent anionic ligand, or two Xs are joined together to form a metallocycle ring with M, or two Xs are joined to form a chelating ligand, a diene ligand, or an alkylidene ligand; and
- each $R^1$, $R^2$, $R^3$, $R^4$, $R^5$, $R^6$, $R^7$, $R^8$, $R^9$, and $R^{10}$ is independently selected from hydrogen, $C_1$-$C_{10}$ substituted or unsubstituted alkyls.

11. The method of claim 10, wherein $R^6$ and $R^9$ are each $C_1$ to $C_4$ alkyl; $R^1$-$R^4$, $R^5$, $R^7$, $R^8$, and $R^{10}$ are each independently selected from methyl, ethyl, or hydrogen; M is hafnium; and each X is independently $C_1$-$C_3$ alkyl or a halide.

12. The method of claim 10, wherein any one or more of the pairs $R^1$ and $R^2$, $R^3$ and $R^4$, $R^5$ and $R^6$, $R^6$ and $R^7$, $R^8$ and $R^9$, and $R^9$ and $R^{10}$ are bonded together to form a saturated or partially saturated cyclic ring structure.

13. The method of claim 1, wherein the solvent is a liquid hydrocarbon.

14. The method of claim 1, wherein the quench comprises the solvent.

15. The method of claim 1, wherein the quench consists essentially of carbon dioxide and solvent.

16. The method of claim 1, wherein the quench is free of water.

17. The method of claim 1, wherein the quench is free of methanol.

18. The method of claim 1, wherein the polymer has less than about 5% increase in Mooney viscosity (ML 1+4, 125° C.) compared to a comparative polymer prepared by the method of any preceding claim without adding the quench in step (c).

* * * * *